US011355820B2

United States Patent
Dai et al.

(10) Patent No.: US 11,355,820 B2
(45) Date of Patent: *Jun. 7, 2022

(54) TRANSFERABLE ELECTRODE TIP FOR RESISTANCE WELDING AN ANODE TAB TO THE CASING OF AN ELECTROCHEMICAL CELL

(71) Applicant: Greatbatch Ltd., Clarence, NY (US)

(72) Inventors: Xiangyang Steve Dai, Saginaw, MI (US); Kenneth L. Grubb, Snyder, NY (US); Kenneth B. Talamine, Plymouth, MN (US); Brian D. Panzer, Williamsville, NY (US)

(73) Assignee: Greatbatch Ltd., Clarence, NY (US)

( * ) Notice: Subject to any disclaimer, the term of this patent is extended or adjusted under 35 U.S.C. 154(b) by 239 days.

This patent is subject to a terminal disclaimer.

(21) Appl. No.: 16/550,367

(22) Filed: Aug. 26, 2019

(65) Prior Publication Data

US 2020/0067064 A1 Feb. 27, 2020

Related U.S. Application Data

(63) Continuation-in-part of application No. 16/504,423, filed on Jul. 8, 2019, now Pat. No. 11,114,661.

(60) Provisional application No. 62/722,475, filed on Aug. 24, 2018.

(51) Int. Cl.
*H01M 50/531* (2021.01)
*B23K 11/11* (2006.01)
(Continued)

(52) U.S. Cl.
CPC ......... *H01M 50/531* (2021.01); *B23K 11/115* (2013.01); *B23K 11/20* (2013.01);
(Continued)

(58) Field of Classification Search
CPC ............. H01M 50/531; H01M 50/186; H01M 50/191; H01M 50/543; H01M 50/116;
(Continued)

(56) References Cited

U.S. PATENT DOCUMENTS

| 4,310,609 A | 1/1982 | Liang et al. |
| 4,391,729 A | 7/1983 | Liang et al. |

(Continued)

OTHER PUBLICATIONS

Extended European Search Report, Application No. 19193531.1 dated Dec. 3, 2019.

*Primary Examiner* — Michael L Dignan
(74) *Attorney, Agent, or Firm* — Michael F. Scalise

(57) ABSTRACT

A new weld configuration is used to obtain a robust and consistent resistance weld between the tabs of an anode current collector and the casing of an electrochemical cell. This is done by adding a resistive transferable electrode tip between at least one of the welding electrodes, preferably the movable welding electrode, and the stacked parts that are being joined together. The purpose of the transferable electrode tip is to generate a sufficient amount of heat during the welding process so that the stacked parts are joined together without adding any product functionality. In one embodiment of the present invention, the transferrable electrode tip is a stainless-steel ball, the stacked anode current collector tabs are of nickel, and the cell casing is of stainless-steel.

11 Claims, 11 Drawing Sheets

(51) Int. Cl.
  *B23K 11/20* (2006.01)
  *B23K 11/30* (2006.01)
  *B23K 11/31* (2006.01)
  *B23K 11/28* (2006.01)
  *H01M 50/186* (2021.01)
  *H01M 50/191* (2021.01)
  *H01M 50/543* (2021.01)

(52) U.S. Cl.
  CPC .............. *B23K 11/28* (2013.01); *B23K 11/30* (2013.01); *B23K 11/31* (2013.01); *H01M 50/186* (2021.01); *H01M 50/191* (2021.01); *H01M 50/543* (2021.01)

(58) Field of Classification Search
  CPC .. H01M 50/155; H01M 50/54; H01M 10/052; H01M 10/0585; H01M 50/528; H01M 50/545; B23K 11/115; B23K 11/20; B23K 11/30; B23K 11/31; B23K 11/28; B23K 11/315; Y02E 60/10
  See application file for complete search history.

(56) References Cited

U.S. PATENT DOCUMENTS

| | | | |
|---|---|---|---|
| 4,830,940 A | 5/1989 | Keister et al. | |
| 4,964,877 A | 10/1990 | Takeuchi et al. | |
| 5,472,810 A | 12/1995 | Takeuchi et al. | |
| 5,502,292 A | 3/1996 | Pernicka et al. | |
| 5,516,340 A | 5/1996 | Takeuchi et al. | |
| 5,707,756 A * | 1/1998 | Inoue | H01M 50/578 429/57 |
| 6,037,559 A * | 3/2000 | Okabe | B23K 11/115 219/91.23 |
| 6,551,747 B1 | 4/2003 | Gan | |
| 6,613,474 B2 | 9/2003 | Frustaci et al. | |
| 8,609,278 B2 * | 12/2013 | Fuhr | H01M 10/0587 429/209 |
| 9,325,029 B1 * | 4/2016 | Chui | H01M 6/46 |
| 9,899,655 B2 | 2/2018 | Dai | |
| 2002/0146620 A1 * | 10/2002 | Connell | H01M 50/54 429/161 |
| 2011/0206976 A1 * | 8/2011 | Yoo | H01M 50/543 429/153 |
| 2011/0281140 A1 * | 11/2011 | Lee | H01M 50/538 429/7 |
| 2015/0072201 A1 * | 3/2015 | Kubota | H01M 10/0422 429/94 |
| 2015/0217395 A1 * | 8/2015 | Spinella | B23K 35/0288 219/86.22 |
| 2016/0099456 A1 * | 4/2016 | Kwon | H01M 6/46 429/94 |
| 2016/0155996 A1 * | 6/2016 | Dai | H01M 50/538 429/179 |
| 2020/0020940 A1 * | 1/2020 | Talamine | H01M 50/54 |

* cited by examiner

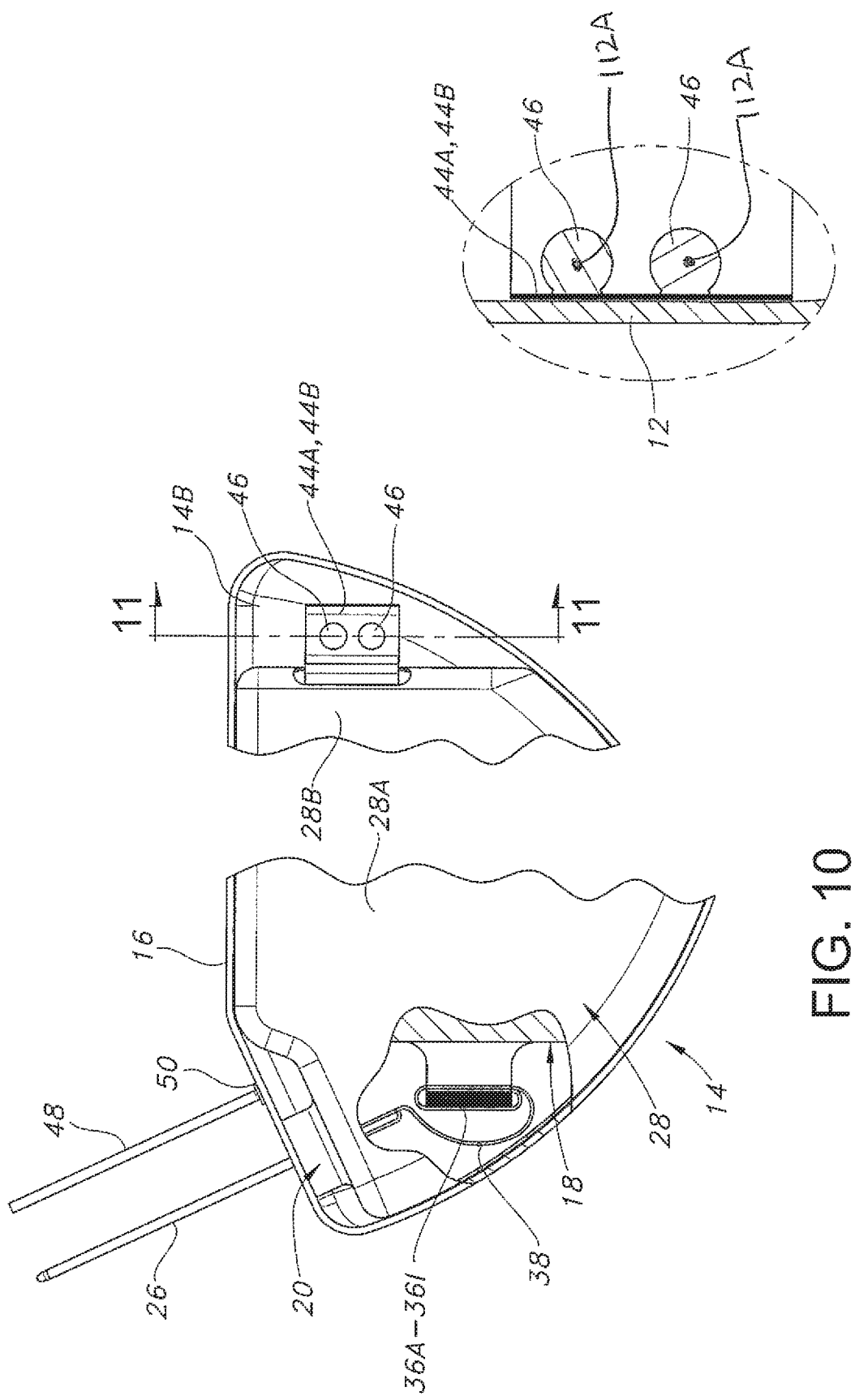

TRANSFERABLE ELECTRODE TIP FOR RESISTANCE WELDING AN ANODE TAB TO THE CASING OF AN ELECTROCHEMICAL CELL

CROSS-REFERENCE TO RELATED APPLICATIONS

This application claims priority to U.S. Provisional Application Ser. No. 62/722,475, filed on Aug. 24, 2018, and is a continuation-in-part application of U.S. patent application Ser. No. 16/504,423, filed on Jul. 8, 2019, now U.S. Pat. No. 11,114,661.

BACKGROUND OF THE INVENTION

1. Field of the Invention

The present invention generally relates to the conversion of chemical energy to electrical energy. More particularly, this invention is directed to an improvement in weld connecting the tab or tabs of an anode current collector to the casing of an electrochemical cell. In a case-negative design, the casing is the anode terminal. A terminal pin electrically isolated from the casing serves as the cathode terminal. Alternatively, in a case-positive cell configuration, the present invention relates to weld connecting the cathode tab or tabs of the cathode current collector to the casing with the terminal pin being the anode terminal.

2. Prior Art

When connecting the tabs of a current collector to the casing of an electrochemical cell, resistance welding is commonly used. One noteworthy advantage over other joining techniques is that with resistance welding the anode tab is clamped against the cell casing, which keeps the two parts in their intended position prior to the weld being formed. Resistance welding is also a simple one-step process that can be used at locations within the casing that are relatively hard to access.

Materials such as nickel, titanium, and aluminum, which are commonly used for the anode current collector including its tabs, have relatively high electrical conductivity and corrosion resistivity. Stainless-steel, titanium, and aluminum are typical casing materials, and they have relatively high electrical resistivity in comparison to the commonly used anode current collector materials. Welding electrodes are commonly made of copper. Since the resistivity of copper is significantly lower than that of the anode current collector materials, for example nickel, there can be some amount of copper softening so that when the welding operation is completed, and the movable welding electrode is being withdrawn from the anode current collector tab, the welding electrode can stick to the anode tab. At the least, there can be copper contamination left behind on the anode tab. In effect, the copper welding electrode has welded itself to the nickel anode tab and breaking this connection can cause the anode tab to tear or pull away from the casing to which it is being welded.

Moreover, when two anode tabs are stacked one upon the other, it is not uncommon for the anode tabs to not weld to each other in a robust manner that is desired for implantable medical applications. The best way to determine this is to subject the anode tabs to a pull test, which is not only an added and time-consuming step but, as discussed above, can be difficult to perform when the anode tabs are welded to the cell casing in a hard to access location.

Further, the challenge of resistance welding an exemplary nickel anode current collector tab to an exemplary stainless-steel casing is augmented by the difference is thicknesses of the two materials. A typical anode current collector has a thickness of about 0.0002 inches while a casing is typically about 0.012 inches thick. Any sticking of the movable copper welding electrode to the anode tab can easily result in damage such as tearing of the tab as the welding electrode is withdrawn.

Thus, there is a need for a new welding technique that is repeatable and suitable for joining two dissimilar materials together, such as the tab of an anode current collector to the casing of an electrochemical cell. Moreover, the new welding technique must produce a robust weld when two layers of the same material are being joined to each other. That is the situation when two anode tabs are stacked one upon the other and then welded to the cell casing. The present welding technique provides such a new welding technique.

SUMMARY OF THE INVENTION

The present invention provides a new weld design that overcomes the drawbacks of prior art resistance welding techniques with the result that welds between the anode tabs and the cell casing are robust and consistence from one weld to the next. According to the present invention, a relatively high resistance material, referred to as a transferable electrode tip, is added between the movable welding electrode and the two or more stacked anode tabs being welded to a cell casing. The transferable electrode tip creates a resistive balance between the ball and case that helps to direct or concentrate the heat generated during the welding process so that the anode tabs are welded together at a "point" contact or point weld. For redundancy, it is preferred that at least two point-welds are made between the stacked anode tabs and the cell casing. Thus, the purpose of the transferable electrode tip is to improve process capability without adding any product functionality. Unless its removal, either partially or completely, is a mandatory requirement, the transferable electrode tip remains in the final weld as a transferred and affixed electrode tip.

The foregoing and additional advantages and characterizing features of the present invention will become clearly apparent upon reading the ensuing description together with the included drawings.

BRIEF DESCRIPTION OF THE DRAWINGS

FIG. 10 is a partly broken away, side elevational view of the electrode assembly 18 housed inside the metal casing 12 for the electrochemical cell 10 shown in FIG. 1.

FIG. 11 is a cross-sectional view taken along line 11-11 of FIG. 10.

DETAILED DESCRIPTION OF THE PREFERRED EMBODIMENTS

Figure 1:
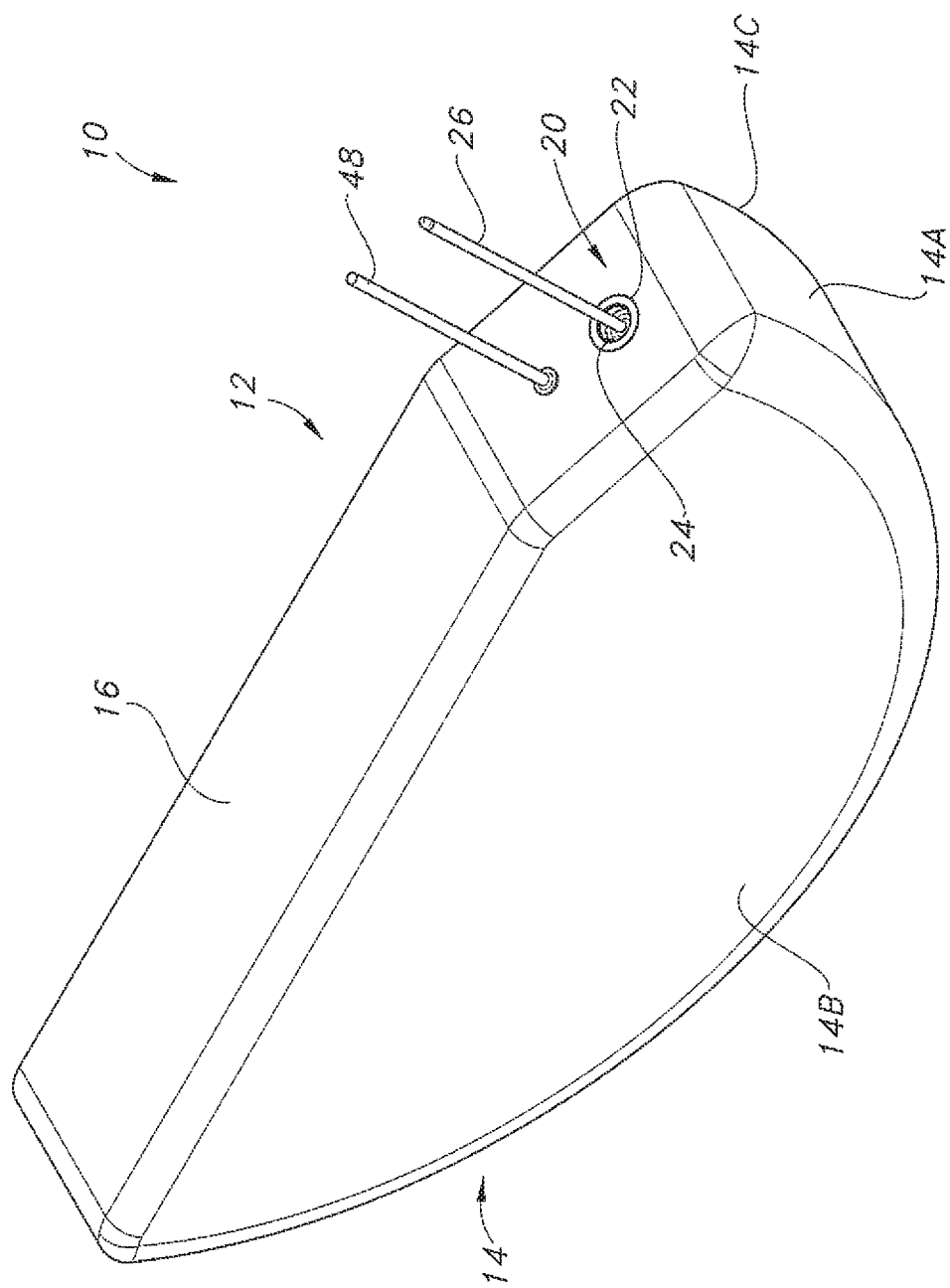
FIG. 1 is a perspective view of an electrochemical cell 10 according to the present invention.

Turning now to the drawings, FIG. 1 is a perspective view of an electrochemical cell 10 according to the present invention. The cell 10 is contained in a hermetically sealed casing 12 comprising an open-ended container 14 closed by a lid 16. After an electrode assembly 18 (FIGS. 3 to 7) is housed inside the container 14, its open-end is closed by the lid 16. The container 14 comprises a surrounding edge wall 14A joined to a front major sidewall 14B and a back major sidewall 14C. The front and back sidewalls 14B, 14C are substantially parallel to each other. An exemplary casing design that is suitable for electrochemical cell 10 is of mating clamshell portions as describes in U.S. Pat. No. 6,613,474 to Frustaci et al., which is assigned to the assignee of the present invention and incorporated herein by reference. Typical materials for the casing include stainless-steel, titanium, and aluminum.

The surrounding edge wall 14A supports a glass-to-metal seal 20 (GTMS) comprising a ferrule 22 connected to the casing lid 16 in an appropriately sized opening, and a glass or ceramic material 24 that hermetically seals between the ferrule and a terminal pin 26. The terminal pin 26 extends from inside the casing 12 where it is electrically connected to one of the anode and the cathode, preferably the cathode, to outside the casing for connection to a load to be powered by the cell 10. That way, the GTMS 20 electrically isolates the terminal pin 26 from the casing 12 with the casing serving as the other terminal for the cell, typically the negative terminal electrically connected to the anode of the electrode assembly 18.

Figure 2:
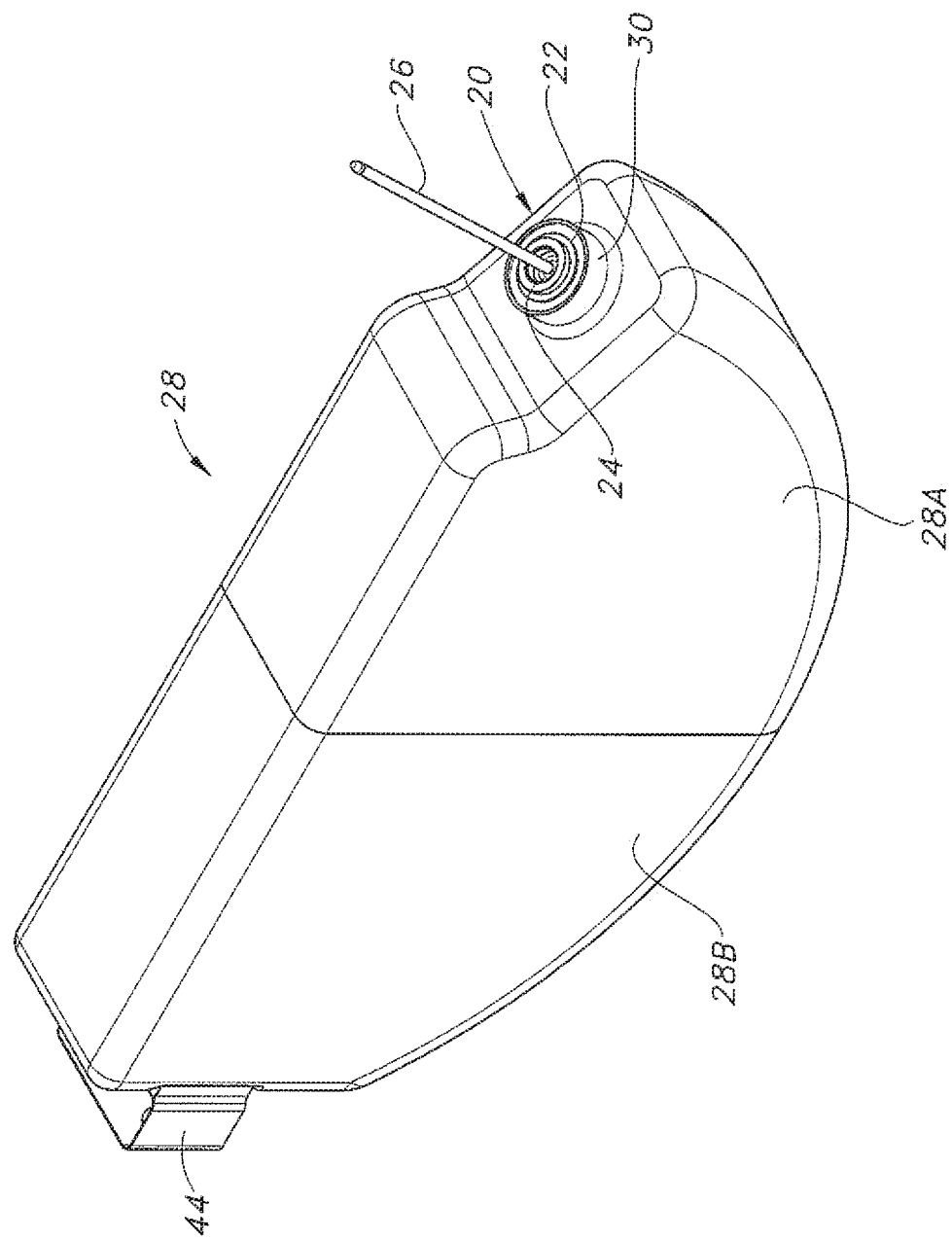
FIG. 2 is a perspective view of the cell 10 shown in FIG. 1, but with the casing 12 removed and the electrode assembly 18 housed in a polymeric envelope 28.

FIG. 2 is a perspective view of the electrochemical cell 10 shown in FIG. 1, but with the casing 12 having been removed from the electrode assembly 18. In that respect, this figure shows that the electrode assembly 18 comprising an anode in electrochemical association with a cathode is housed inside a polymeric envelope 28. The polymeric envelope 28 is comprised of a right-side portion 28A that is mated to a left-side portion 28B. The right-side polymeric portion 28A is contoured to fit snugly over the electrode assembly 18 and has an opening 30 that is sized and shaped to receive the GTMS 20. With the right-side portion of the polymeric envelope in place, the left-side portion 28B is moved over the left end of the electrode assembly 18 until it mates with the right-side envelope portion 28A. In that respect, the left-side envelope portion 28B is somewhat larger than the right-side portion 28A so that the end of the right-side portion is received inside the left-side portion in a snug-fitting relationship. Alternatively, the right-side envelope portion 28A is somewhat larger than the left-side portion 28B so that the end of the left-side portion is received inside the right-side portion in a snug-fitting relationship.

FIGS. 3 to 8 illustrate that the electrode assembly 18 is comprised of a relatively long or elongate plate-shaped anode 32 comprising an anode active material, for example lithium, supported on an anode current collector. Suitable materials for the anode current collector include nickel, titanium, and aluminum. The anode is folded into a serpentine configuration as described in U.S. Pat. No. 5,147,737 to Post et al., which is assigned to the assignee of the present invention and incorporated herein by reference.

In the exemplary embodiment of the electrochemical cell 10 illustrated in the drawings, nine cathode plates 34A, 34B, 34C, 34D, 34E, 34F, 34G, 34H and 34I reside or are interleaved between adjacent folds of the serpentine anode 32. While nine cathode plates are shown in the exemplary electrochemical cell 10, it is within the scope of the present invention that there can be as few as two cathode plates up to many more than nine plates. Twenty to fifty plates are possible in some cell designs. Regardless the number of cathode plates, however, the serpentine anode is of a length that is sufficient to have an adequate number of folds so that a cathode plate is nested or interleaved in a fold with the major sides of each cathode plate facing directly to a portion of the anode.

Each cathode plate is comprised of a cathode current collector (not shown) supporting a cathode active material on its opposed major faces or sides. The cathode plates 34A, 34B, 34C, 34D, 34E, 34F, 34G, 34H and 34I are contained in their own separator envelope (not numbered) so that when the cathode plates are interleaved between folds of the serpentine anode, a short-circuit does not occur. In one embodiment, lithium as an exemplary anode active material is supported on the opposed major sides or faces of the anode current collector except for the side portions of the serpentine anode 32 facing outwardly next to the first cathode plate 36A and the ninth cathode plate 36I.

Figure 3:
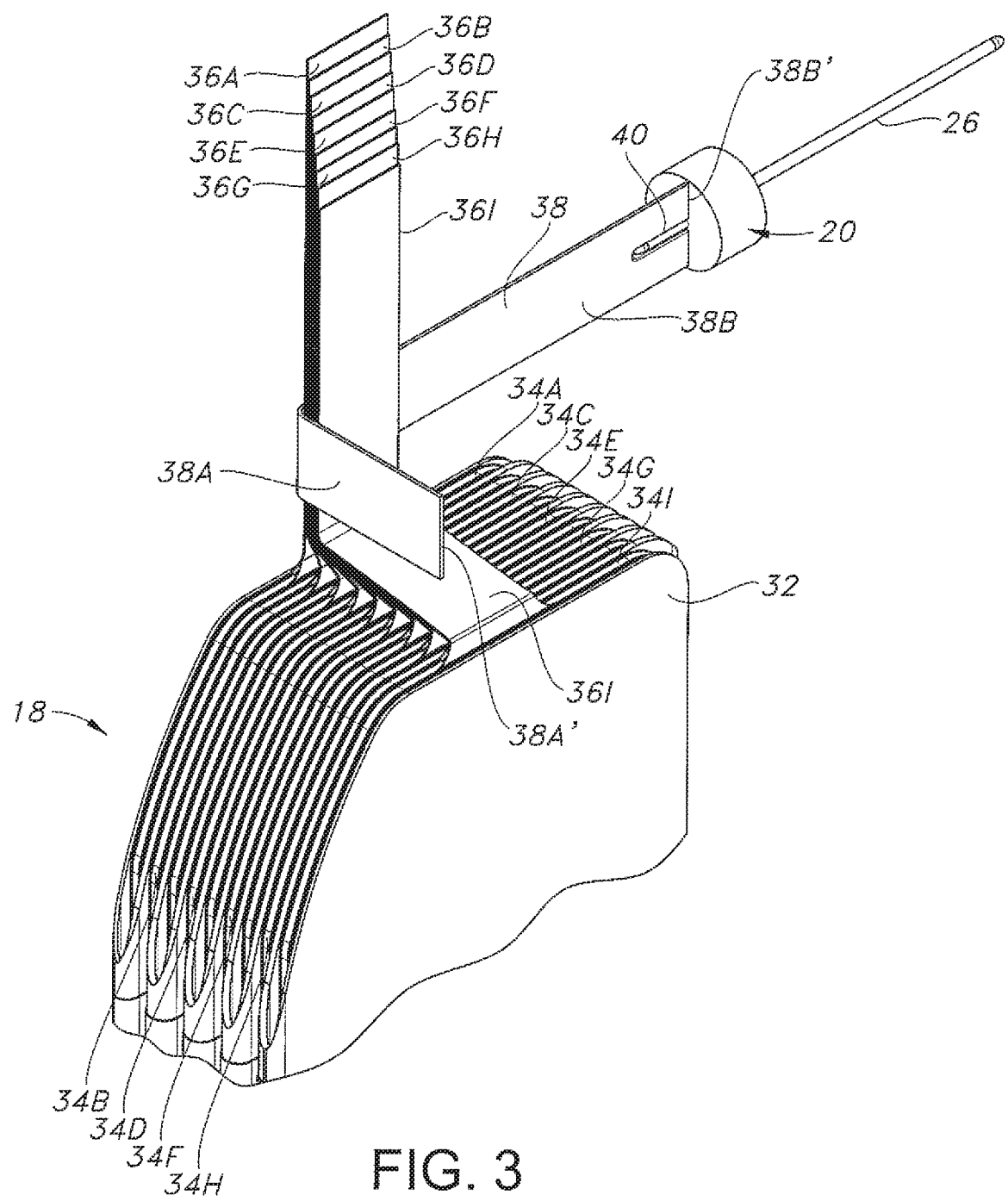
FIG. 3 is a perspective view, partly broken away, showing the extending cathode tabs 36A to 36I folded into a stacked configuration with the proximal portion of a metal strip-shaped hoop 38 supporting a distal glass-to-metal seal 20 partially folded around the tabs.

The cathode plates 34A, 34B, 34C, 34D, 34E, 34F, 34G, 34H and 34I are provided with respective extending tabs 36A, 36B, 36C, 36D, 36E, 36F, 36G, 36H and 34I. FIG. 3 shows that the first cathode tab 36A extends outwardly from its current collector in a substantially co-planar relationship. The other cathode tabs 36B to 36I are bent so that each one lays on top of the next immediately adjacent tab in a stacked relationship. In that respect, the second cathode tab 36B is bent so that it lays against an inner surface of the first cathode tab 36A. The third cathode tab 36C is bent so that it lays against an inner surface of the second cathode tab 36B. The fourth cathode tab 36D is bent so that it lays against an inner surface of the third cathode tab 36C. The fifth cathode tab 36E is bent so that it lays against an inner surface of the fourth cathode tab 36D. The sixth cathode tab 36F is bent so that it lays against an inner surface of the fifth cathode tab 36E. The seventh cathode tab 36G is bent so that it lays against an inner surface of the sixth cathode tab 36F. The eighth cathode tab 36H is bent so that it lays against an inner surface of the seventh cathode tab 36G. And, the ninth cathode tab 36I is bent so that it lays against an inner surface of the eighth cathode tab 36H.

With the cathode tabs 36A to 36I in the bent and stacked relationship shown in FIG. 3, a metal strip 38 having a length extending from a proximal portion 38A having a proximal end 38A' to a distal portion 38B having a distal end 38B' and serving as a cathode lead is wrapped around the stacked tabs. First, the proximal portion 38A of the metal strip 38 is bent into a L-shaped configuration and contacted to the aligned edges of the nine tabs and the outer surface of the first cathode tab 36A. The opposed distal portion 38B of the metal strip has an axial slot 40, preferably centered, that receives the proximal end of the terminal pin 26 comprising the GTMS 20.

Figure 4:
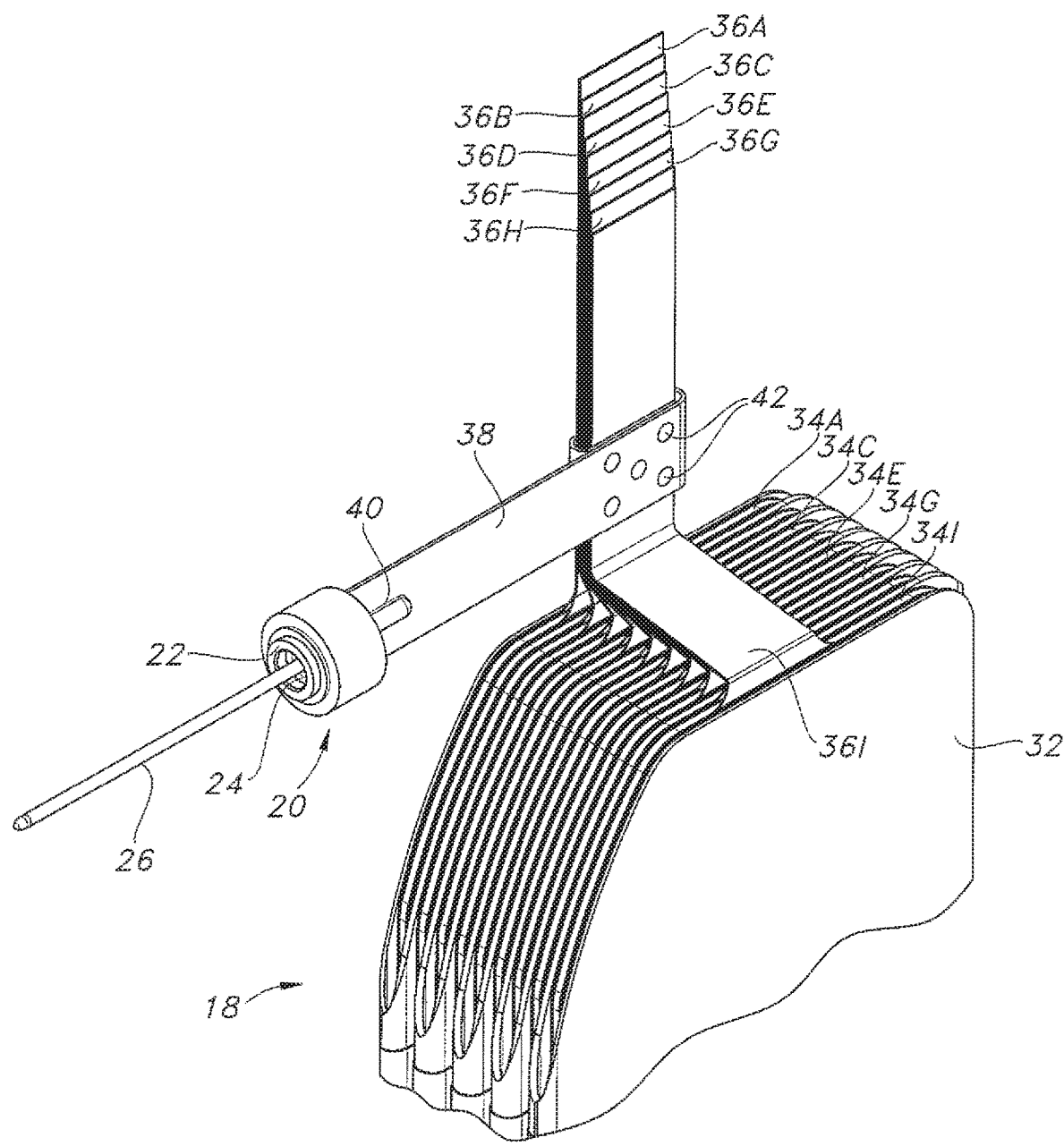
FIG. 4 is a perspective view, partly broken away, showing the strip-shaped hoop 38 of FIG. 3 encircling the bundled cathode tabs 36A to 36I and connected thereto with welds 42.

FIG. 4 shows that the proximal portion 38A (FIG. 3) of the metal strip is bent so that it lays against the inner surface of the ninth cathode tab 36I. In this position, the proximal end 38A' (FIG. 3) of the metal strip 38 is substantially aligned with the edges of the nine tabs 34A to 34I opposite the bend in the initial L-shaped strip configuration shown in FIG. 3.

The distal portion 38B (FIG. 3) of the metal strip connected to the GTMS 20 is then bent backwards 180° so that it lays against the proximal portion 38A of the strip contacting the inner surface of the ninth cathode tab 36I. The metal strip now has the shape of a strip-shaped hoop surrounding or encircling the cathode tabs 36A to 36I.

Figure 6:
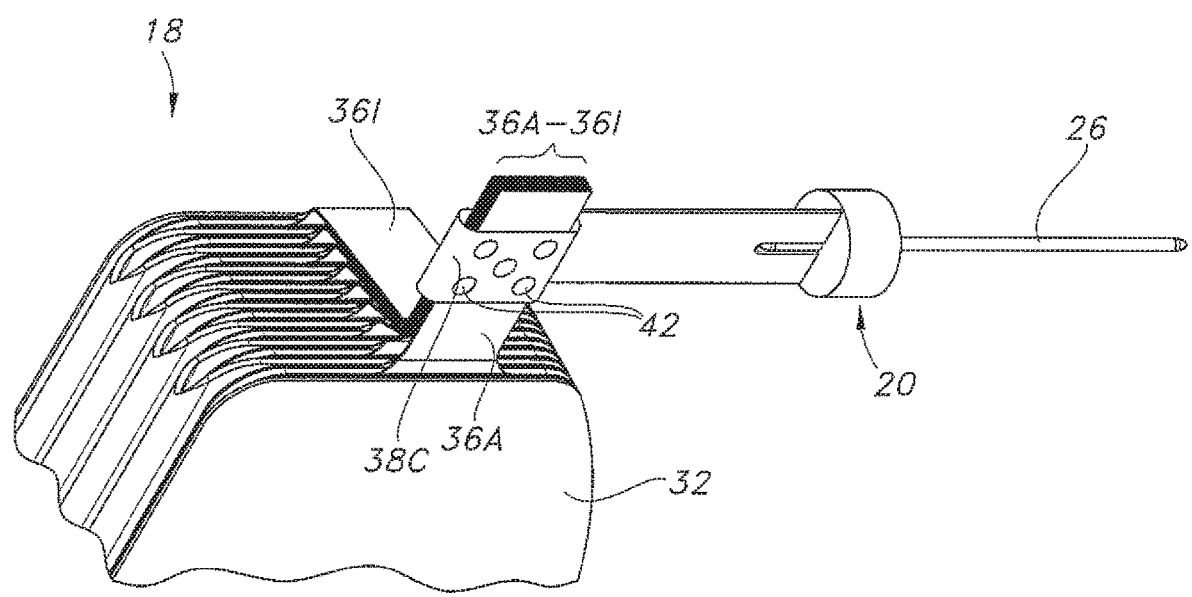
FIG. 6 is a perspective view, partly broken away, of the configuration illustrated in FIG. 5, but from an opposite perspective.

A welding device, for example a laser welder (not shown), is used to connect the backwards bent distal portion 38B to the underlying proximal portion 38A of the metal strip with a series of welds 42. FIG. 6 shows that the welds 42 penetrate completely through the distal portion 38B of the metal strip laying over the proximal portion 38A and through the nine cathode tabs 36A to 36I and then to an intermediate portion 36C of the metal strip. The intermediate portion 38C resides between the proximal portion 38A and the distal portion 38B of the metal strip. Moreover, while five welds are shown, that is not intended to be limiting. A lesser or greater number of welds 42 is contemplated by the scope of the present invention. The important aspect is that the metal strip 38 is securely connected to the bent and overlying cathode tabs 36A to 36I so that the strip serves as a band or hoop that confines and joins the cathode tabs together, and that the welds penetrate completely through the various layers so that the welds 42 exist on the "back side" at the intermediate strip portion 38C. That way, weld integrity is visually verifiable from both sides of the hoop-shaped metal strip 38.

Figure 5:
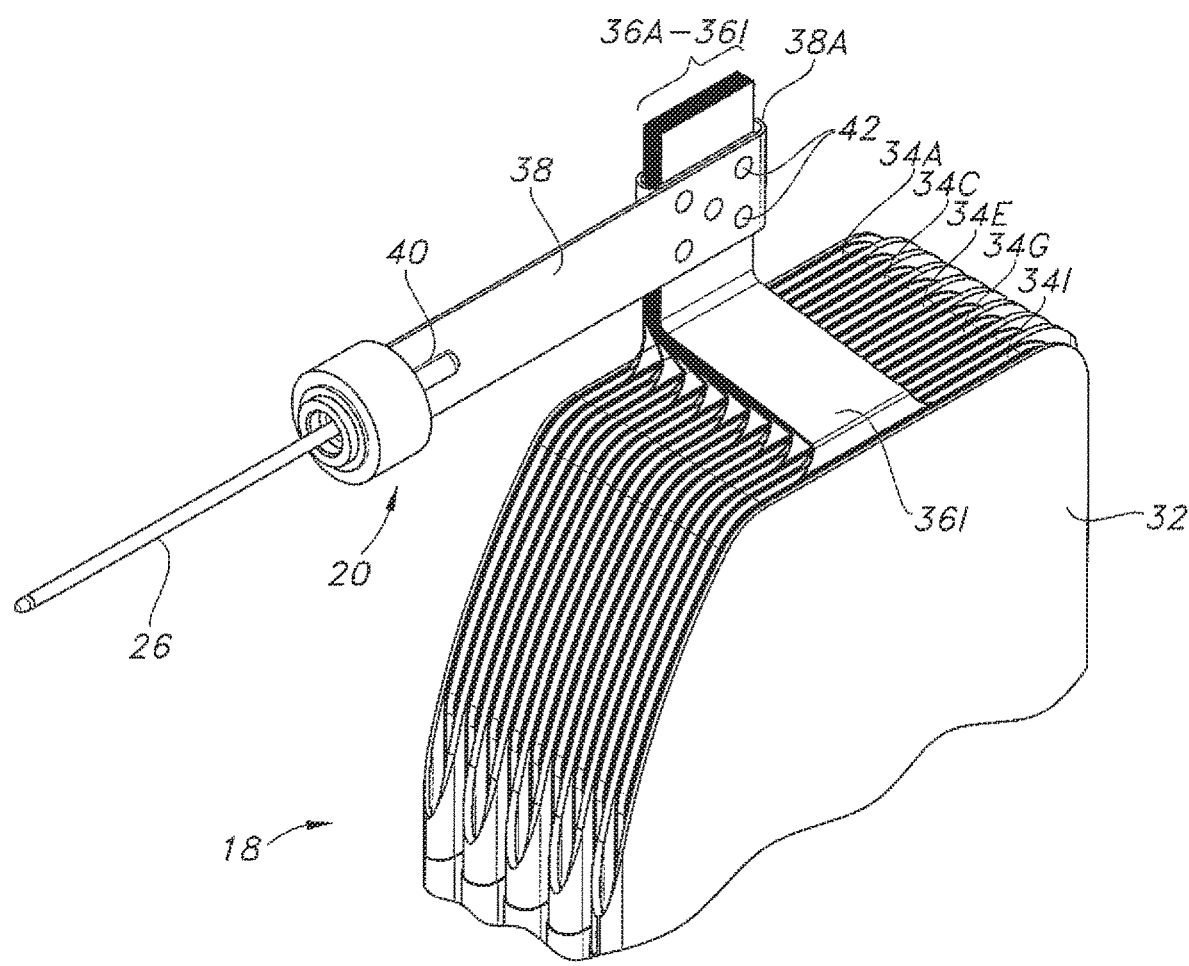
FIG. 5 is a perspective view, partly broken away, showing the trimmed cathode tabs 36A to 36I with the encircling strip-shaped hoop 38.

FIGS. 5 and 6 illustrate that the cathode tabs 36A to 36I are trimmed so that their cut ends are a short distance spaced above the metal band 38 to thereby leave a bundle of extending stubs of the cathode tabs.

Figure 7:
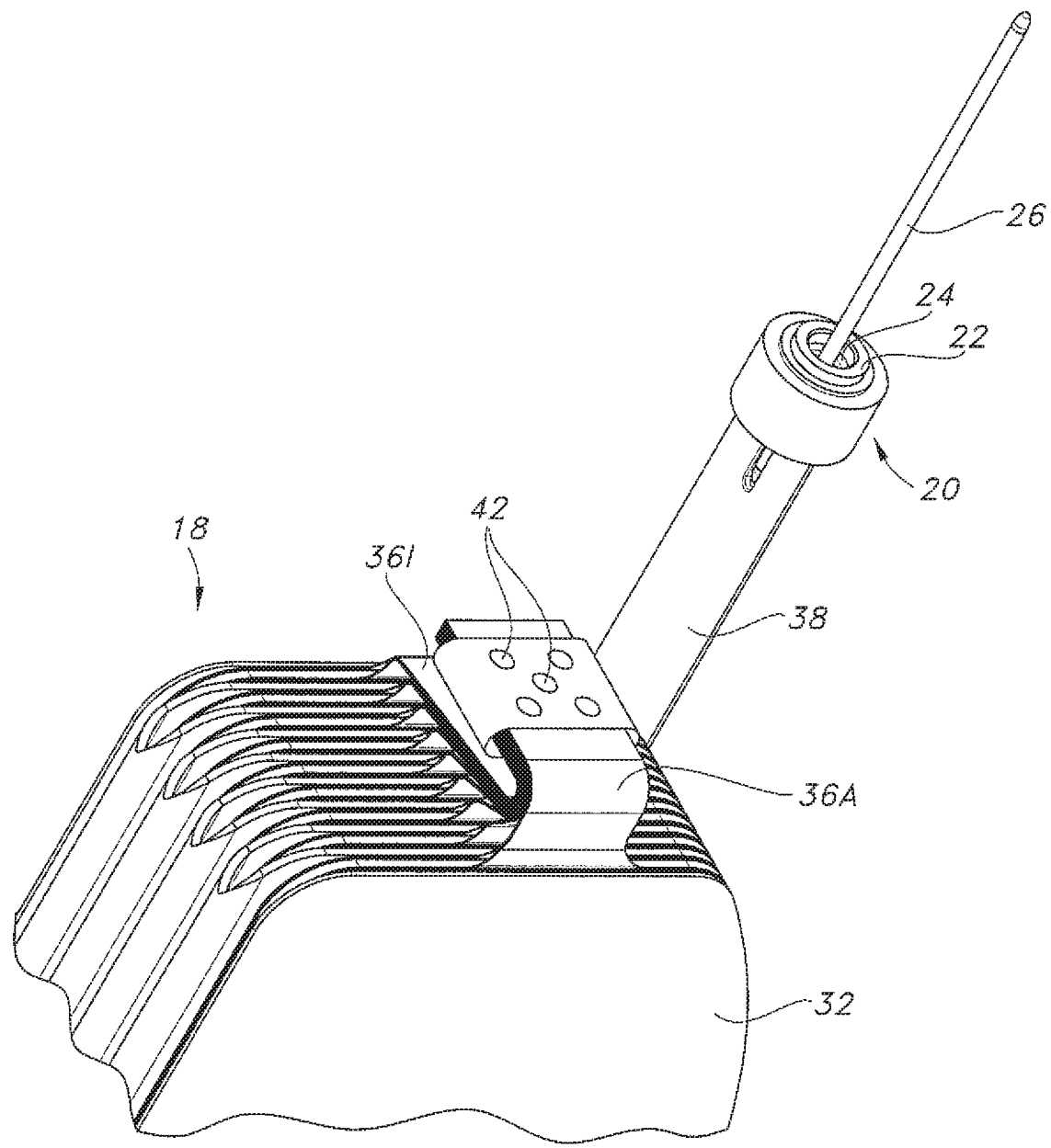
FIG. 7 is a perspective view, partly broken away, of the electrode assembly 18 illustrated in FIG. 6, but with the cathode tabs 36A to 36I bent over the electrode assembly 18 and the strip-shaped hoop 38 bent so that the outwardly extending terminal pin 26 is substantially perpendicular to the upper edge of the electrode assembly.
Figure 8:
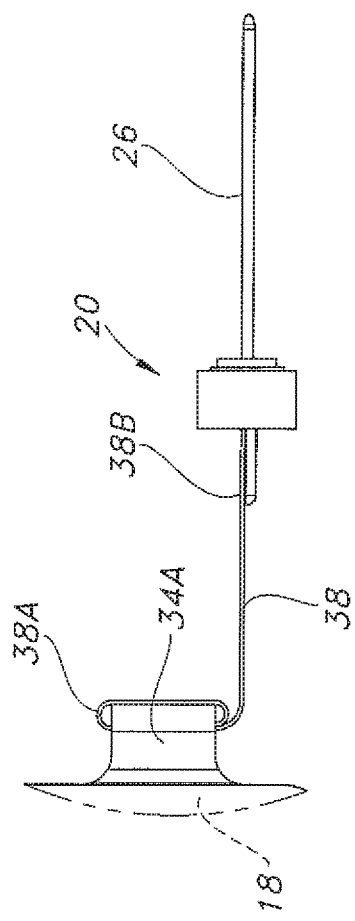
FIG. 8 is a partly broken away, side elevational view of the strip-shaped hoop 38 encircling the cathode tabs 36A to 36I and the extending terminal pin 26.

FIG. 7 shows that the banded cathode tabs 36A to 36I have now been folded so that a distal portion of the ninth tab 36I faces its proximal portion in an overlaid relationship. In this configuration, the metal strip 38 resides between the proximal and distal portions of the ninth cathode tab 36I. An outwardly facing side of the first tab 36A distant the ninth tab 36I is spaced furthest from the electrode assembly 18. Then, the metal strip 38 is bent at a right angle proximate the aligned edges of the cathode tabs 36A to 36I. In this configuration, the axis of the terminal pin 26 is substantially perpendicular to the outwardly facing side of the first tab 36A. FIG. 8 is a side view of this configuration.

Figure 9:
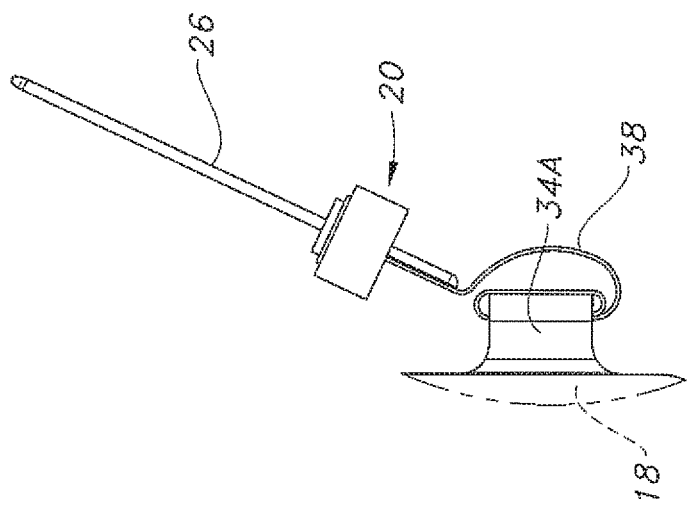
FIG. 9 is a partly broken away, side elevational view of a distal portion of the strip-shaped hoop 38 of FIG. 8 bent into a semi-looped configuration.

FIG. 9 shows that the metal strip 38 is then bent into a semi-looped configuration with the axis of the terminal pin 26 being substantially at a 45° angle with respect to the outwardly facing side of the first cathode tab 36A.

FIG. 10 shows the electrode assembly 18 housed in the polymeric envelope 28 with the ferrule 22 of the GTMS 20 secured in the appropriately sized opening 30 in the casing. This drawing also illustrates that the anode current collector (not shown) is provided with anode tabs 44A, 44B that are connected to an inner surface of the casing. Preferably, there are two anode tabs 44A, 44B, one extending from each end of the elongate anode. Connection of the anode tabs 44A, 44B to the casing 12 is made with welds 46. That way, the casing 12 serves as the anode or negative terminal for the cell 10. The negative terminal is completed with a negative terminal pin 48 connected to the casing 12 by a weld 50. FIGS. 1 and 10 illustrate that the negative terminal pin 48 is aligned side-by-side with the positive or cathode terminal pin 26.

An important aspect of the present invention is that to ensure a robust connection, the welds 46 must penetrate completely through the anode tabs 44A, 44B to mechanically contact the inner surface of the casing 12. This contact can be at any one of the casing sidewalls including the surrounding edge wall 14A and the front and back sidewalls 14B, 14C. However, the anode tabs 44A, 44B are of a thinner material than that of the casing sidewalls 14A, 14B and 14C. Typical thicknesses for the anode tabs 44A, 44B range from about 0.00015" to about 0.0003", preferably about 0.0002", while typical thicknesses for the casing sidewalls range from about 0.010" to about 0.020", preferably about 0.012". Moreover, the anode tabs 44A, 44B and the casing sidewalls are of dissimilar materials, which makes forming a robust connection somewhat more difficult than if they were of the same or similar materials. Typically, the anode tabs 44A, 44B are selected from nickel, titanium, and aluminum and the casing is selected from stainless-steel, titanium, and aluminum. An exemplary cell design has nickel as a preferred anode current collector material supporting lithium as an anode active material and stainless-steel as a typical casing material.

Figure 12:
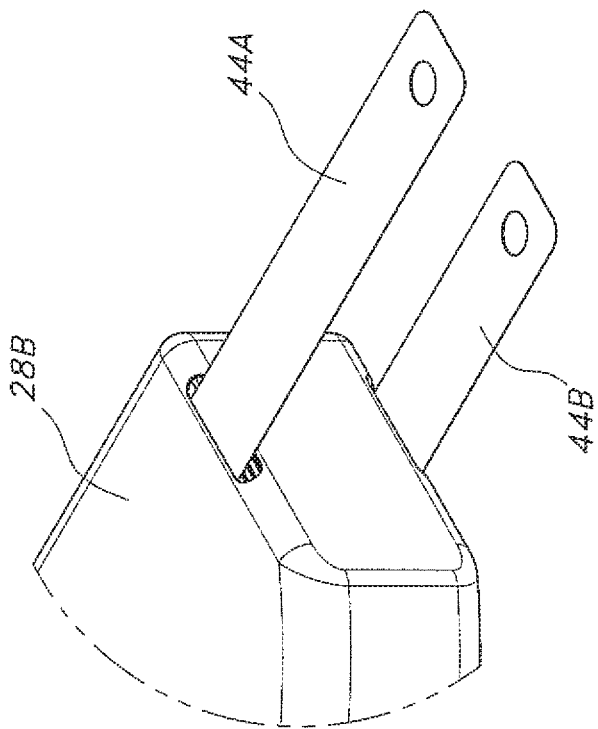
FIG. 12 is a partially broken-away, perspective view of two anode tabs 44A, 44B extending outwardly from a polymeric envelope 28B housing the anode and cathode shown in FIGS. 3 to 7.

As shown in FIG. 12, the anode tabs 44A, 44B extending from each end of the elongate anode current collector are first in an unbent, outwardly extending configuration. Tab 44A is first bent inwardly toward tab 44B along a first crease 52A that is proximate the left-side portion 28B of the polymeric envelope 28. Then, tab 44B is bent upwardly along a second crease 52B so that it lays against tab 44A. The tabs 44A, 44B are then both bent backwardly along a third crease 52C toward the edge of the polymeric envelope portion 28A from which tab 44A extends to assume the configuration shown in FIG. 13. The thusly constructed electrode assembly including the bent anode tabs 44A, 44B is then housed inside the open-ended casing 12 for weld connection of the tabs to the casing serving as the anode terminal.

Figure 13:
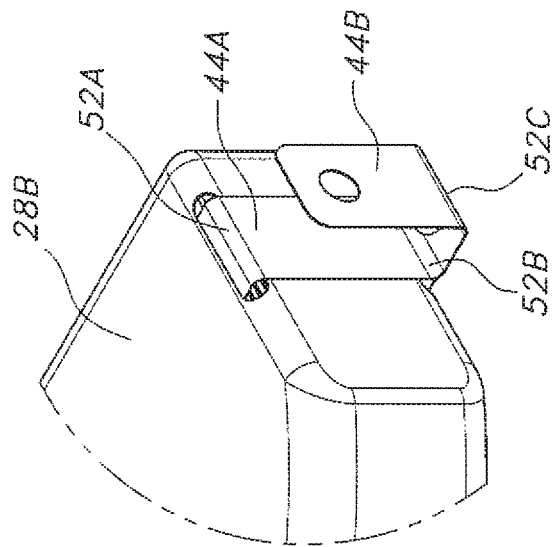
FIG. 13 is a partially broken-away, perspective view of the anode tabs 44A, 44B shown in FIG. 12 after they have been bent into a configuration for weld connection to a sidewall of the cell casing 12.
Figure 14:
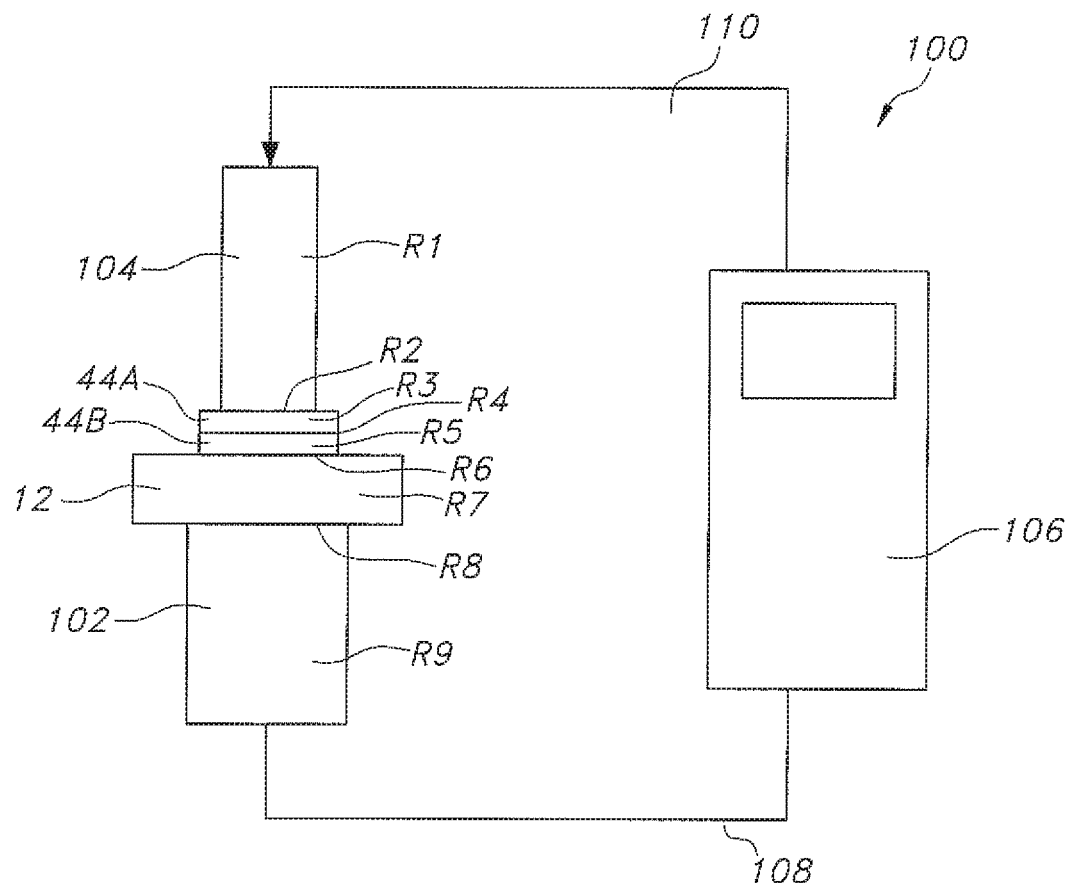
FIG. 14 is a schematic view of a welding assembly 100 for resistance welding the anode tabs 44A, 44B shown in FIG. 13 to the cell casing 12 according to the prior art.

FIG. 14 is a prior art schematic of a welding assembly 100 for tack welding the anode tabs 44A, 44B shown in FIG. 13 to a sidewall of the casing 12. The welding assembly 100 comprises the casing 12 with the anode tabs 44A, 44B laying against an inside surface thereof. This assembly is positioned between a stationary welding electrode 102 and a movable welding electrode 104. As the electrode 104 moves into contact with anode tab 44A, the anode tabs 44A, 44B and the casing 12 are clamped between the electrodes 102, 104. The welding electrodes 102, 104 are electrically connected to a resistance welding power source and control unit 106 which effects the weld connection of the tabs 44A, 44B to each other and to the casing 12.

While resistance welding relies on heat generated through the bulk resistance of the parts being joined and of the welding electrodes, most of the heat that is generated takes the form of contact resistance at the interfaces of the parts with each other and with the welding electrodes. In that respect, because so much heat is concentrated at the various contact resistance interfaces, the total amount of heat that is generated through electrical resistance of the current passing through the parts being joined is often enough to weld a single exemplary nickel anode tab to an exemplary stainless-steel casing. However, if the cell design has an anode with two or more current collector tabs stacked one upon the other, as in the presently illustrated cell 10, a sufficient amount of heat may not be generated between the stacked anode tabs. Since the anode tabs are of the same material, the main reason for the lack of heat generated between the two nickel layers is due to their relatively high conductivity and relatively low thickness of about 0.0002". This creates lower bulk heating in the exemplary nickel current collector tabs 44A, 44B and more importantly a lower contact resistance between the two nickel layers.

In other words, when a cell design requires two or more layers of the same metal to be welded to each other, it is proposed that the clamping pressure exerted by the welding electrode can somewhat negate the contact resistance that normally exists between two different metals with the result that the two anode tab layers act more like a bulk layer of increased thickness than two layers of different materials. This phenomenon means that there is a need to improve the resistance between two metal layers being resistance welded together, such as occurs when two tabs of an exemplary nickel anode current collector are being welded to an exemplary stainless-steel cell casing.

FIG. 14 illustrates this where R1 is the bulk resistance of the movable welding electrode 104, R2 is the contact resistance between electrode 104 and anode tab 44A, R3 is the bulk resistance of anode tab 44A, R4 is the contact resistance between anode tabs 44A and 44B, R5 is the bulk resistance of anode tab 44B, R6 is the contact resistance between anode tab 44B and the casing 12, R7 is the bulk resistance of the casing 12, R8 is the contact resistance between the casing 12 and the stationary welding electrode 102 and R9 is the bulk resistance of the welding electrode 102 and the contact joints and cables 108, 110 to the resistance welding power source and control unit 106.

When joining an exemplary nickel anode tab 44A, 44B to an exemplary stainless-steel casing 12, at the inner and outer surfaces of the casing, R6 and R7 are suitable for generating enough heat for joining the anode tab 44B to the casing with a good bond that is desired for an implantable electrochemical cell application, and the like. However, R3, R4 and R5 may not generate enough heat for joining the anode tabs 44A, 44B together. Consequently, when a relatively low resistance welding electrode 104 is used, welding concerns such as sticking between the anode tabs 44A, 44B and between the welding electrode 104 and the anode tab 44A is not uncommon. Unsticking the welding electrode 104 from the anode tab 44A typically results in a torn tab, which is undesirable and means that the anode tab must be scrapped. Unsticking the welding electrode 104 from the anode tab 44A may also undesirably contaminate the tab with the material of the welding electrode 104, for example with copper from the electrode.

Figure 15:
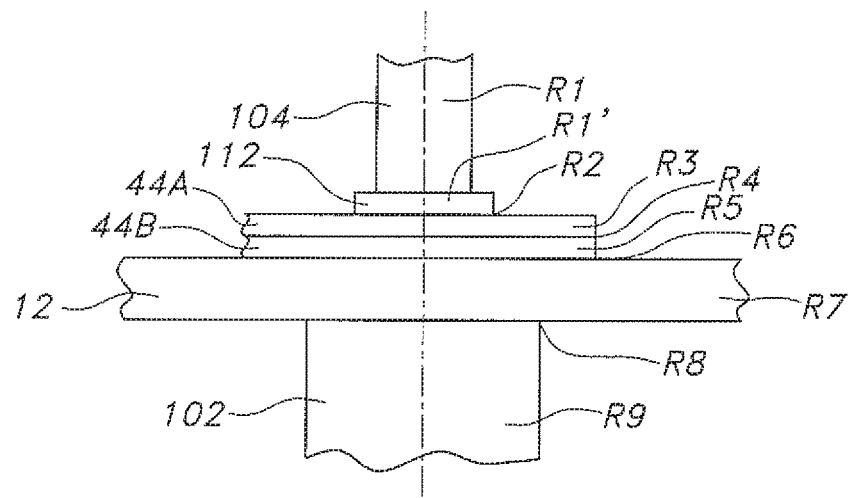
FIG. 15 is a partial schematic view of the welding assembly 100 shown in FIG. 14, but with an added transferrable electrode tip 112 for resistance welding the anode tabs 44A, 44B to the casing 12 according to the present invention.

In FIG. 15, a high resistance transferrable electrode tip 112 of bulk resistance R1' is added to the end of the movable electrode 104 according to the present invention. The transferrable electrode tip 112 is of a refractory metal and is preferably stainless-steel. The relatively high bulk resistance of the transferrable electrode tip 112 helps to focus or drive the heat generated by the movable welding electrode 104 through the contact resistance R2 between electrode 104 and anode tab 44A, through the bulk resistance R3 of anode tab 44A, through the contact resistance R4 between anode tabs 44A and 44B, through the bulk resistance R5 of anode tab 44B, through the contact resistance R6 between anode tab 44B and the casing 12, through the bulk resistance R7 of the casing 12, through the contact resistance R8 between the casing 12 and the stationary welding electrode 102 and to the bulk resistance R9 of the welding electrode 102.

The melting temperature of the copper stationary and movable welding electrodes 102 and 104 is about 1,085° C. (about 1,984° F.), of grade 304 stainless-steel is from about 1,400° C. to about 1,450° C. (about 2,552° F. to about 2,642° F.), of grade 316 stainless-steel is from about 1,375° C. to about 1,400° C. (about 2,507° F. to about 2,552° F.), of nickel is about 1,455° C. (about 2,651° F.), of titanium is about 1,668° C. (3,034° F.) and of aluminum is about 660.3° C. (1,221° F.). Since the melting temperature of the copper welding electrode 102, 104 is significantly less than that of the transferrable electrode tip, for example of stainless-steel having a melting temperature of from 1,375° C. to 1,450° C. depending on the grade, and because the melting temperature of stainless-steel is substantially similar to that of the exemplary nickel anode tab of about 1,455° C., the transferable electrode tip creates a resistive balance between the ball and case that helps to direct or concentrate the heat generated by the welding electrodes so that the anode tabs are mechanically welded together at a "point" contact or point weld 46. Moreover, if the copper electrode should melt in an appreciable manner, leaving any residue behind, that "contamination" is left on the transferred and affixed electrode tip 112A (FIG. 11) portion of the weld 46, which is formed when the transferrable electrode tip 112 at least partially melts during the welding operation, and not on the anode tabs.

In that manner, after the anode tabs 44A, 44B are securely welded to each other and to the casing 12, the movable electrode 104 translates axially away from the welded cell assembly, leaving the transferrable electrode tip 112 behind as a transferred and affixed electrode tip 112A (FIG. 11) portion of the weld 46. The finished casing 12 is removed from the welding assembly 100 and another casing 12/anode tab 44A, 44B sub-assembly is moving into position for the next welding operation. In that respect, the transferrable electrode tip 112 compensates for the various resistance R3, R4 and R5 of the conductive anode tabs 44A, 44B, for example the nickel anode tabs, not generating a sufficient amount of heat during resistance welding to be readily joined together and to the casing.

It is further noted that while the present invention is described with the anode having two anode tabs 44A, 44B, the present welding technique works similarly well when only one anode tab is being welded to the casing or when three, four, five, six or more anode tabs are being welded together and to the casing. This is a function of the transferrable electrode tip 112 having a relatively smaller mass than that of the anode tabs. When the casing is of stainless-steel, it is preferred that the transferrable electrode tip 112 is a stainless-steel ball having a diameter of from about 0.03 inches to about 0.06 inches, preferable about 0.04 inches. If the cell casing is of titanium, another embodiment of the present invention has the transferrable electrode tip 112 likewise being of titanium or, the casing can be of titanium and the transferrable electrode tip 112 is stainless-steel. Moreover, while the transferrable electrode tip 112 is preferably a round ball having a shape similar to a BB shot pellet, that should not be considered as a limitation of the present invention. Instead, the transferrable electrode tip 112 can have the shape of a cone, a square cube, a rectangular cube, or any other irregular shape that is suitable for the cell design being manufactured.

The electrochemical cell 10 can be of a primary or a secondary chemistry. If of a primary chemistry, the anode comprises metals capable of alloying with lithium at potentials below 1.0 V vs. lithium, such as Sn, Si, Al, B, Si—B, and composites of those metals with inactive metals to reduce volume expansion. The form of the anode may vary, but preferably it is of a thin sheet or foil that is pressed, evaporation, or rolled on the metallic anode current collector.

The cathode of a primary cell is of electrically conductive material, preferably a solid material. The solid cathode may comprise a metal element, a metal oxide, a mixed metal oxide, and a metal sulfide, and combinations thereof. A preferred cathode active material is selected from the group consisting of silver vanadium oxide (SVO), copper silver vanadium oxide, manganese dioxide, cobalt nickel, nickel oxide, copper oxide, copper sulfide, iron sulfide, iron disulfide, titanium disulfide, copper vanadium oxide, carbon monofluoride ($CF_x$), and mixtures thereof.

Before fabrication into an electrode for incorporation into the electrochemical cell 10, the cathode active material is mixed with a binder material such as a powdered fluoropolymer, more preferably powdered polytetrafluoroethylene or powdered polyvinylidene fluoride (PVDF) present at about 1 to about 5 weight percent of the cathode mixture. Further, up to about 10 weight percent of a conductive diluent is preferably added to the cathode mixture to improve conductivity. Suitable materials for this purpose include acetylene black, carbon black and/or graphite or a metallic powder such as powdered nickel, aluminum, titanium and stainless steel. The preferred cathode active mixture for the electrochemical cell 10 includes a powdered fluoro-polymer binder present at about 3 weight percent, a conductive diluent present at about 3 weight percent, and about 94 weight percent of the cathode active material.

The primary electrochemical cell 10 includes a nonaqueous, ionically conductive electrolyte having an inorganic, ionically conductive salt dissolved in a nonaqueous solvent and, more preferably, a lithium salt dissolved in a mixture of a low viscosity solvent and a high permittivity solvent. The salt serves as the vehicle for migration of the anode ions to intercalate or react with the cathode active material and suitable salts include $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, LiSCN, $LiO_3SCF_3$, $LiC_6F_5SO_3$, $LiO_2CCF_3$, $LiSO_6F$, $LiB(C_6HO_4$, $LiCF_3SO_3$, and mixtures thereof.

Suitable low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy,2-methoxyethane (EME), ethyl methyl carbonate, methyl propyl carbonate, ethyl propyl carbonate, diethyl carbonate, dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl, formamide, dimethyl acetamide, γ-valerolactone, γ-butyrolactone (GBL), N-methyl-pyrrolidinone (NMP), and mixtures thereof. The preferred electrolyte for a lithium primary cell 10 is 0.8M to 1.5M $LiAsF_6$ or $LiPF_6$ dissolved in a 50:50 mixture, by volume, of PC as the preferred high permittivity solvent and DME as the preferred low viscosity solvent.

By way of example, in an illustrative electrochemical cell, the active material of the cathode is silver vanadium oxide (SVO) as described in U.S. Pat. Nos. 4,310,609 and 4,391,729 to Liang et al., or copper silver vanadium oxide as described in U.S. Pat. Nos. 5,472,810 and 5,516,340 to Takeuchi et al., all assigned to the assignee of the present invention, the disclosures of which are hereby incorporated by reference.

Another embodiment of the present invention has the cathode plates 34A, 34B, 34C, 34D, 34E, 34F, 34G, 34H and 34I each of the configuration: SVO/first current collector/$CF_x$/second current collector/SVO, wherein SVO is silver vanadium oxide. This alternate embodiment for the cathode plates is described in U.S. Pat. No. 6,551,747 to Gan, which is assigned to the assignee of the present invention and incorporated herein by reference. Again, twenty to fifty plates, each of the configuration: SVO/first current collector/$CF_x$/second current collector/SVO are contemplated in some cell designs.

In an exemplary secondary electrochemical cell 10, in addition to lithium, the anode can comprise a material capable of intercalating and de-intercalating an alkali metal, and preferably lithium. A carbonaceous anode comprising any of the various forms of carbon (e.g., coke, graphite, acetylene black, carbon black, glassy carbon, etc.), which are capable of reversibly retaining the lithium species, is preferred. Graphite is particularly preferred due to its relatively high lithium-retention capacity. Regardless the form of carbon, fibers of the carbonaceous material are particularly advantageous because they have excellent mechanical properties that permit them to be fabricated into rigid electrodes capable of withstanding degradation during repeated charge/discharge cycling.

The cathode of the exemplary secondary electrochemical cell 10 preferably comprises a lithiated material that is stable in air and readily handled. Examples of such air-stable lithiated cathode materials include oxides, sulfides, selenides, and tellurides of such metals as vanadium, titanium, chromium, copper, molybdenum, niobium, iron, nickel, cobalt and manganese. The more preferred oxides include $LiNiO_2$, $LiMn_2O_4$, $LiCoO_2$, $LiCo_{0.92}Sn_{0.08}O_2$, $LiCo_{1-x}Ni_xO_2$, $LiFePO_4$, $LiNi_xMn_yCo_{1-x-y}O_2$, and $LiNi_xCo_yAl_{1-x-y}O_2$.

For the electrochemical cell 10, the lithiated active material is preferably mixed with a conductive additive selected from acetylene black, carbon black, graphite, and powdered metals of nickel, aluminum, titanium and stainless steel. The cathode further comprises a fluoro-resin binder, preferably in a powder form, such as PTFE, PVDF, ETFE, polyamides and polyimides, and mixtures thereof.

The respective anode and cathode current collectors are selected from stainless steel, titanium, tantalum, platinum, gold, aluminum, cobalt nickel alloys, highly alloyed ferritic stainless steel containing molybdenum and chromium, and nickel-, chromium- and molybdenum-containing alloys. Nickel is preferred for the anode current collector supporting lithium and aluminum is preferred for the cathode current collectors.

Suitable secondary electrochemical systems are comprised of nonaqueous electrolytes of an inorganic salt dissolved in a nonaqueous solvent and more preferably an alkali metal salt dissolved in a quaternary mixture of organic carbonate solvents comprising dialkyl (non-cyclic) carbonates selected from dimethyl carbonate (DMC), diethyl carbonate (DEC), dipropyl carbonate (DPC), ethyl methyl carbonate (EMC), methyl propyl carbonate (MPC), and ethyl propyl carbonate (EPC), and mixtures thereof, and at least one cyclic carbonate selected from propylene carbonate (PC), ethylene carbonate (EC), butylene carbonate (BC), and vinylene carbonate (VC), and mixtures thereof. Organic carbonates are generally used in the electrolyte solvent system for such battery chemistries because they exhibit high oxidative stability toward cathode materials and good kinetic stability toward anode materials.

Whether of a primary or a secondary chemistry, the cell casing 12 is filled with the appropriate electrolyte described hereinabove through a fill opening or port in the casing. The opening is then hermetically sealed such as by close-welding a plug (not shown) in the fill opening using a laser.

Thus, the present invention relates to an electrochemical cell 10 comprising an electrode assembly 18 formed from an elongate anode that is folded into a serpentine configuration with a plurality of cathode plates 34A to 34I nested or interleaved between the folds. To make a robust and secure connection of the respective cathode tabs 36A to 36I to a cathode terminal, the tabs are folded into an overlapping and stacked relationship with each cathode tab touching its immediately adjacent neighbor tab. The proximal end of a metal strip 38 serving as a cathode lead is wrapped around the stacked cathode tabs and then a laser is used to weld through all layers of the metal strip 38 serving as a hoop and each of the bound cathode tabs. Preferably, the laser welds are visible from the opposite side of the strip-shaped hoop surrounding the stacked cathode tabs from which the welding device, for example the laser beam of a laser welder, first contacts the assembly. This provides the welding engineer with a visual indication that the welded connection of the metal strip-shaped hoop to the stacked cathode tabs is robust and structurally sound.

The distal end of the metal strip 38 is provided with an axial slot 40 that receives the proximal end of a cathode terminal pin 26. The terminal pin, which is welded to the metal strip 38, is part of a hermetic glass-to-metal seal (GTMS) 20. With the GTMS hermetically secured in an opening in the cell casing 12, the terminal pin 26 is electrically isolated from the casing 12 with the plurality of cathode plates being electrically connected to each other through the welded metal strip 38.

Moreover, anode tabs 44A, 44B extending from the opposite ends of the serpentine anode are resistance welded to an inner surface of the casing 12 using the welding assembly 100 shown in FIG. 15 including the transferrable electrode tip 112. The resulting weld or welds 46 have a profile of: melted transferrable electrode tip 112 providing a transferred and affixed electrode tip 112A (FIG. 11) welded to anode tab 44A welded to anode tab 44B in turn welded to the casing 12 according to the present invention. This welded configuration completes the case-negative design of the exemplary electrochemical cell 10.

It is further within the scope of the present invention that the cell 10 can have a case-positive configuration. Such a cell configuration has the cathode in the shape of a serpentine electrode with anode plates interleaved between adjacent folds. The serpentine cathode current collector also has at least one and preferably two cathode tabs extending outwardly therefrom. It is these tabs that are resistance welded to the casing 12 as described in detail hereinabove for the anode tabs 44A, 44B.

It is appreciated that various modifications to the inventive concepts described herein may be apparent to those of ordinary skill in the art without departing from the spirit and scope of the present invention as defined by the appended claims.

What is claimed is:

1. An electrochemical cell, comprising:
a) a casing;
b) an electrode assembly housed inside the casing, the electrode assembly comprising:
 i) at least a first cathode and a second cathode, the first cathode comprising a first cathode active material contacted to a first cathode current collector having an outwardly extending first cathode tab with opposed first and second major sides, and the second cathode comprising a second cathode active material contacted to a second cathode current collector having an outwardly extending second cathode tab with opposed third and fourth major sides; and
 ii) a cathode lead extending from a cathode lead proximal portion to a cathode lead distal portion, wherein, with the first and second cathodes in a side-by-side arrangement, a first section and a second section of the cathode lead proximal portion contact the respective fourth major side of the second cathode tab and the first major side of the first cathode tab with a third section of the cathode lead proximal portion contacting the first section of the cathode lead proximal portion; and
 iii) at least one cathode weld contacting the first, second and third sections of the cathode lead proximal portion and the first and second cathode tabs;
 iv) at least one anode comprising:
  A) an anode active material contacted to an anode current collector having at least an outwardly extending first anode tab, wherein the at least one anode is positioned between the side-by-side first and second cathodes; and
  B) at least one anode weld electrically and mechanically connecting the first anode tab to the casing serving as a negative terminal for the cell, wherein the at least one anode weld has the following profile: the casing of a first metal, the first anode tab of a second metal, and a transferrable and affixed electrode tab of a third metal, and wherein the first and third metals are the same or different and they are different than the second metal of the first anode tab; and
 v) a separator residing between the anode and the first and second cathodes; and
c) a feedthrough comprising a terminal pin of a glass-to-metal seal supported by the casing, wherein the terminal pin extends from a terminal pin proximal end electrically connected to the cathode lead distal portion to a terminal pin distal end located outside the casing to thereby serve as a positive terminal for the cell; and d) an electrolyte in the casing activating the electrode assembly.

2. The electrochemical cell of claim 1, wherein the electrode assembly further comprises a second cathode comprising a second cathode active material contacted to a second cathode current collector, and wherein, with the first and second cathodes in a side-by-side arrangement, the at least one anode is positioned between the first and second cathodes.

3. The electrochemical cell of claim 1, wherein the anode active material of the at least one anode is comprised of lithium, and the first and second cathode active materials of the first and second cathodes are individually selected from the group of silver vanadium oxide, copper silver vanadium oxide, manganese dioxide, cobalt nickel, nickel oxide, copper oxide, copper sulfide, iron sulfide, iron disulfide, titanium disulfide, copper vanadium oxide, and mixtures thereof.

4. The electrochemical cell of claim 1, wherein the anode active material of the at least one anode is a carbonaceous material, and the first and second cathode active materials of the first and second cathodes are individually selected from the group of $LiNiO_2$, $LiMn_2O_4$, $LiCoO_2$, $LiCo_{0.92}Sn_{0.08}O_2$, and lithium nickel cobalt oxide.

5. The electrochemical cell of claim 1, wherein the transferred and affixed electrode tip of the third metal is a ball having a diameter of from about 0.03 inches to about 0.06 inches.

6. The electrochemical cell of claim 1, wherein the transferred and affixed electrode tip of the third metal is stainless-steel, the first anode tab of the second metal is nickel, and the casing of the first metal is stainless-steel.

7. The electrochemical cell of claim 1, wherein the at least one anode has the first anode tab and at least an outwardly extending second anode tab, and wherein the at least one anode weld electrically and mechanically connects the transferred and affixed electrode tip to the first anode tab, and the first and second anode tabs to each other, and the second anode tab to the casing.

8. The electrochemical cell of claim 7, wherein the transferred and affixed electrode tip of the third metal is stainless-steel, the first and second anode tabs of the second metal are selected from the group of nickel, titanium, and aluminum, and the casing of the first metal is selected from the group consisting of stainless-steel, titanium, and aluminum.

9. The electrochemical cell of claim 7, wherein the at least one anode weld electrically and mechanically connects the transferred and affixed electrode tip to the first anode tab, the first and second anode tabs to each other, and the second anode tab to the casing.

10. The electrochemical cell of claim 7, wherein the first and second anode tabs each have a thickness of about 0.0002 inches.

11. The electrochemical cell of claim 1, wherein the casing has an inner surface, and wherein the at least one anode weld penetrates completely through the first anode tab to mechanically contact the inner surface of the casing.

* * * * *